United States Patent [19]
Puri et al.

[11] Patent Number: 6,148,330
[45] Date of Patent: Nov. 14, 2000

[54] SYSTEM AND METHOD FOR AUTOMATICALLY GENERATING CONTENT FOR A NETWORK CHANNEL

[75] Inventors: Deepak Puri; Kevin Yurica, both of San Francisco, Calif.; John Marshall, Saratoga, Conn.

[73] Assignee: Netscape Communications Corp., Mountain View, Calif.

[21] Appl. No.: 08/971,996

[22] Filed: Nov. 17, 1997

[51] Int. Cl.[7] .................................................. G06F 15/16
[52] U.S. Cl. ......................................... 709/217; 709/219
[58] Field of Search .................................. 709/217, 219, 709/226, 229, 250

[56] References Cited

U.S. PATENT DOCUMENTS

| | | | |
|---|---|---|---|
| 5,727,156 | 3/1998 | Herr-Hoyman et al. | 709/219 |
| 5,790,793 | 8/1998 | Higley | 709/218 |
| 5,799,285 | 8/1998 | Klingman | 705/26 |
| 5,870,559 | 2/1999 | Leshem et al. | 709/224 |
| 5,870,767 | 2/1999 | Kraft, IV | 707/501 |
| 5,893,127 | 4/1999 | Tyan et al. | 707/513 |
| 5,905,248 | 5/1999 | Russell et al. | 235/462 |
| 5,913,215 | 6/1999 | Rubinstein et al. | 707/10 |

OTHER PUBLICATIONS

"Netscape Netcaster FAQ" retreived via the Internet and World–Wide–Web at http://home.netscape.com/comprod/products/communicator/netcaster_faq.htm, Oct. 10, 1997 at 6:16pm.

"Netscape Communicator Glossary" retreived via the Internet and World–Wide–Web at http://home.netscape.com/comprod/products/communicator/glossary.htm, Oct. 10, 1997, 6:18pm.

"Netscape Netcaster–Dynamic Information–Delivery Tool for Internet and Internet Users" retreived via the Internet and World–Wide–Web at Oct. 10, 1997 at 6:15 pm.

"Bill Gates' Gift to the Web" from *Time Magazine*, Nov. 10th, 1997.

Primary Examiner—Zarni Maung
Attorney, Agent, or Firm—Erik B. Cherdak & Associates, LLC

[57] ABSTRACT

A system and method for automatically generating content for distribution via a network channel includes and involves a channel service provider that has a first automatic data processing system that includes a data storage sub-system for storing a network document and a first processor that is operative to specify a section of the network document to be broadcast via the network channel and to automatically scan the network document to extract and store the section of the network document in a network addressable resource within the data storage sub-system. The system and method also includes and involves a second automatic data processing system which is coupled to the channel service provider and which includes a content manifestation device and a second processor that is operative to access the network addressable resource to retrieve the section of the network document and to cause the content manifestation device to manifest the section of the network document.

41 Claims, 8 Drawing Sheets

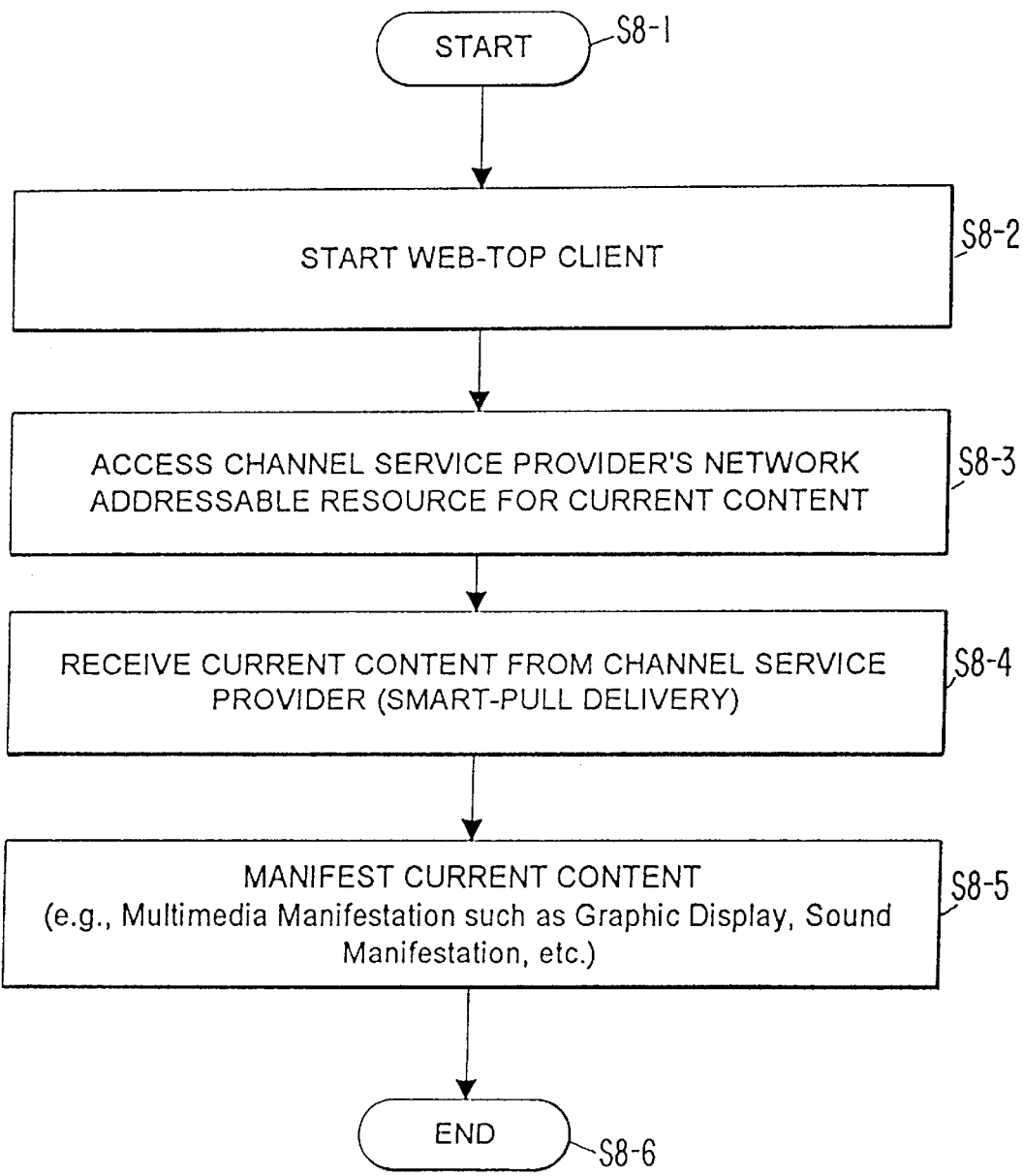

SYSTEM AND METHOD FOR AUTOMATICALLY GENERATING CONTENT FOR A NETWORK CHANNEL

BACKGROUND OF THE INVENTION

1. Field of the Invention

The present invention relates to network channels that are accessible via the Internet and world wide web.

2. Description of the Related Art

It is well known that the Internet and world wide web have become widely used to distribute information to a large number of people. For example, network users can now direct their personal computers along with world wide web browser software (e.g., the NETSCAPE® COMMUNICATOR™ browser suite) to visit a web site such as WWW-.NETSCAPE.COM to retrieve information (also referred to as "content") related to current events within the Internet community and links to other web sites. Typically, in order to receive current content, network users and, in particular, web browser users have to manually direct their web browsers to particular network sites on some sort of regular, periodic basis. Unfortunately, however, remembering to periodically visit a set of web sites to retrieve current content can become quite difficult. And, if the web sites have not changed since a previous visit, the network user could waste a significant amount of time in collecting and gathering already received content.

To address the difficulties associated with manual retrieval of content via the Internet and world wide web and to create commercial services that provide current content on a more regular basis, content providers (e.g., sports enterprises, news providers, companies, etc.) have established channel-type network services. Such channel services or "network channels" automatically provide current and dynamic content to network users who subscribe to the same. In essence, channel service providers broadcast content that is updated with new information that fits the particular interests of network channel subscribers.

Network channels are made possible as a result of what have been referred to as "webtop" clients. A webtop client such as the NETCASTER™ software package from NETSCAPE COMMUNICATIONS CORP. allows a network channel user or "subscriber" to receive content automatically. Additionally, subscribers may establish areas on their computer desktops (i.e., graphic displays) that are continuously updated with current content from one or more network channels.

Despite the obvious advantages provided by network channels in terms of their ability to automatically deliver dynamic content to channel subscribers, channel service providers, face significant problems in terms of actually generating dynamic content. Additionally, organizations that seek to establish a network channel, often must employ teams of personnel to manage the tasks of generating and installing new and current channel content on a regular basis. If such organizations intend to operate a network channel in addition to a typical web site, their problems are exacerbated by the fact that they often have to duplicate content in addition to needing additional content creation personnel. For example, content to be displayed on a typical web site may be germane to a network channel broadcast (e.g., a news event related to current events about company happenings). As such, the only ways that the organization may place such content on a web site and on a network channel at the same time include duplicating and possibly changing the appearance of the content for dual system display, and delivering static content via a network channel. The problems associated with duplication of content and effort are not acceptable options in the business world due to the associated costs. Moreover, automatic or "push" delivery of static web sites through network channels defeats the nature and purpose of network channels—delivery of dynamic and current content. Accordingly, there exists no good way for organizations to automatically generate network channel content without incurring significant costs and burdens.

Thus, there exists a need to provide an improved system and method for automatically generating content for a network channel. Such a system and method must be able to process existing network documents without requiring the same to become inoperable within conventional web browser technologies. Moreover, to be commercially meaningful and viable, a system and method according to the present invention must be able to automatically scan and extract content from network documents without requiring content providers to take on content formatting and generation burdens that may otherwise slow or impede the content generation process.

SUMMARY OF THE INVENTION

In view of the foregoing comments regarding the related art, the principal object of the present invention is to solve the aforementioned problems.

It is another object of the present invention to provide a system and method for automatically generating network channel content efficiently and without hindering any existing processes to generate content for other Internet and WWW purposes.

It is a further object of the present invention to provide a system and method for tagging network documents with channel content tags to specify content that may be extracted and broadcast over a network channel via the Internet and WWW.

It is still another object of present invention to provide a system and method for automatically generating network channel content by scanning and extracting specified content within static network documents.

It is still a further object of the present invention to provide a system and method for automatically generating network channel content by scanning and extracting specified content based on parameters corresponding to a network channel service.

By achieving the aforementioned objects of the present invention, several benefits are realized. For example, channel service/content providers will be able to take advantage of the present invention to automatically generate content for their network channels efficiently and without having to incur increased costs and burdens associated with additional content generation. Additionally, content feed services such as book publishers, news services, etc., will be able to distribute content that may be pre-tagged (i.e., pre-fabricated content) and that is immediately ready for content extraction by network channel service/content providers. Finally, network channel subscribers will benefit from the present invention by realizing a greater variety of dynamic and content-rich channels.

The present invention achieves the aforementioned objects to realize the foregoing benefits by providing a system and method for automatically generating content for distribution via a network channel that include and involve a channel service provider that has a first automatic data processing system that further includes a data storage sub-system for storing a network document and a first processor that is operative to specify a section of the network document to be broadcast via the network channel and to automatically scan the network document to extract and store the section of the network document in a network addressable resource within the data storage sub-system. The system and method also includes and involves a second automatic data processing system which is coupled to the channel service provider and which includes a content manifestation device and a second processor that is operative to access the network addressable resource to retrieve the section of the network document and to cause the manifestation device to manifest the section of the network document.

According to another aspect of the present invention, a system and method for automatically generating content for a network channel are provided that include and involve a data storage sub-system storing a network document containing at least one tag specifying a section of the network document that is to be broadcast via the network channel, and a processor that is coupled to the data storage sub-system and which is operative to automatically scan the network document for the section thereof to be broadcast via the network channel, and to automatically extract and store the section of the network document in the data storage sub-system.

According to another aspect of the present invention, a system and method for manifesting content received via a network channel are provided that include and involve a display device, a data storage sub-system, and a processor which is coupled to the data storage sub-system and to the display device. The processor is operative to access the network channel and a corresponding network addressable resource. The network addressable resource stores automatically generated content corresponding to a specified section of a network document. Additionally, the processor is operative to retrieve the automatically generated content, to store the automatically generated content in the data storage sub-system, and to cause the display device to display the automatically generated content.

According to a final aspect, the present invention provides a computer-readable medium that contains a software program that is operative to control an automatic data processing system that includes an access module for accessing a network channel and a corresponding network addressable resource. The network addressable resource stores automatically generated content corresponding to a specified section of a network document. Also included is a retrieval module for retrieving the automatically generated content corresponding to the specified section of the network document via the network channel, and a manifestation module for manifesting the automatically generated content corresponding to the specified section of the network document within the automatic data processing system.

BRIEF DESCRIPTION OF THE DRAWING FIGURES

The present invention is described below with reference to the following drawing figures, of which:

Figure 1:
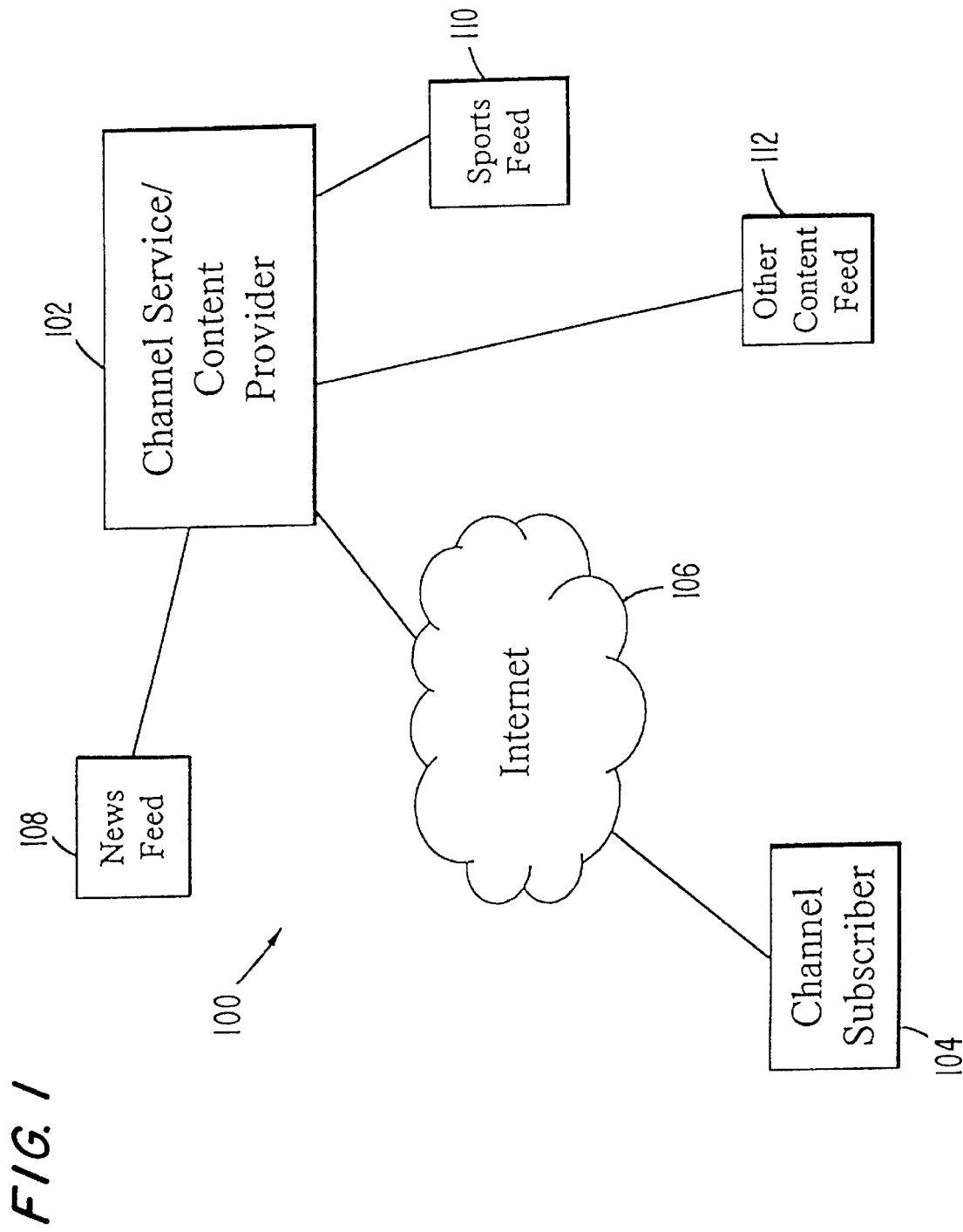
FIG. 1 is a diagram of a system wherein channel content is automatically generated and broadcast to a channel subscriber according to a preferred embodiment of the present invention.
Figure 7:
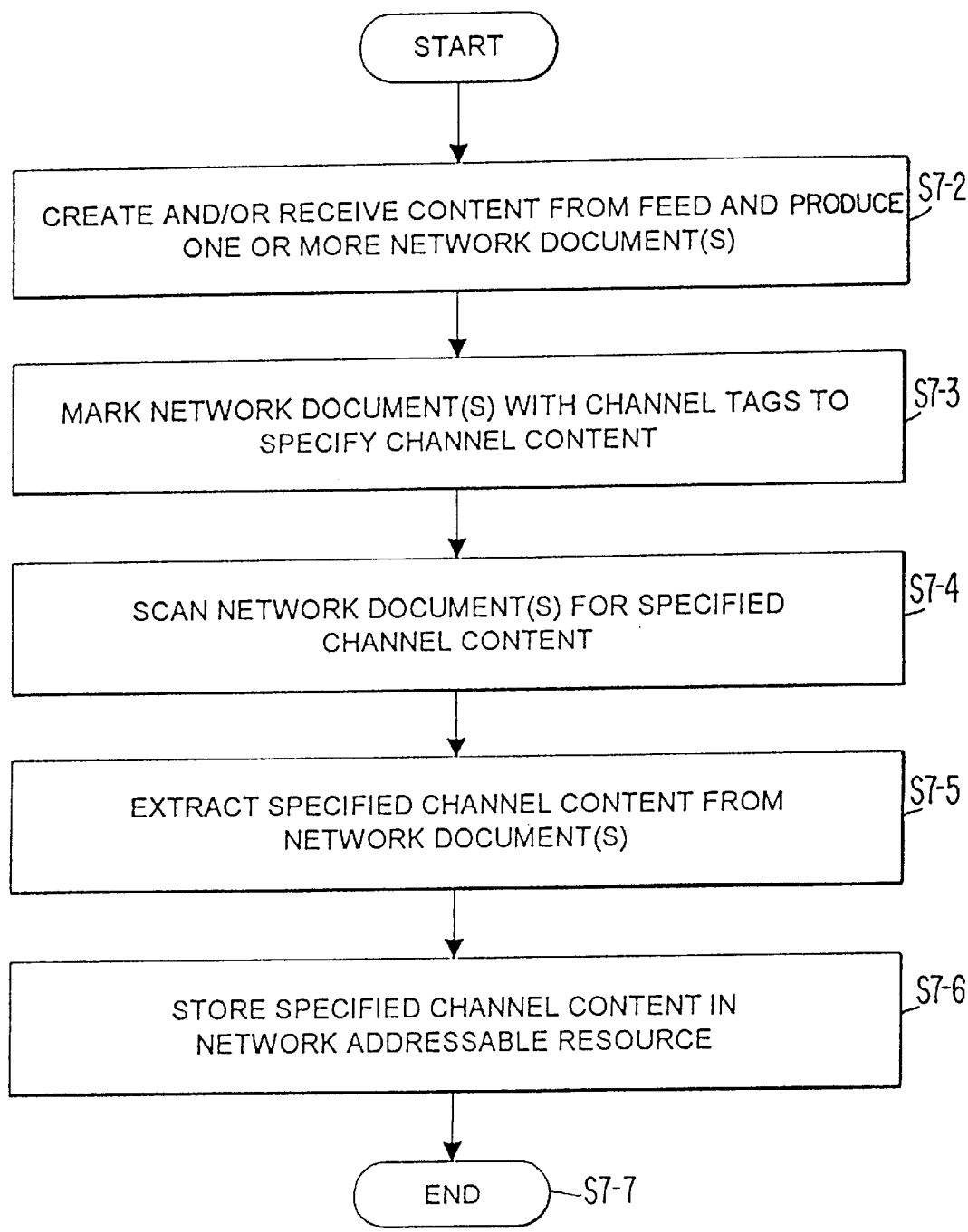

FIG. 7 is a flow chart that illustrates the operations carried out by the channel service/content provider depicted in FIG. 1 to automatically generate content for a network channel according to a preferred embodiment of the present invention; and FIG. 8 is a flow chart that illustrates the operations of the channel subscriber depicted in FIG. 1 to receive and manifest content that is automatically generated by a channel service/content provider according a preferred embodiment of the present invention.

DETAILED DESCRIPTION OF THE PREFERRED EMBODIMENTS

The present invention is now described with reference to the drawing figures that were briefly described above. Unless otherwise specified, like parts are referred to with like reference numerals.

The following paragraphs address definitions used throughout this section, an overview of a system wherein content is automatically generated according to the present invention, a detailed description of the structural aspects of the present invention, and a detailed description of the operational aspects of the present invention.

I. DEFINITIONS

The following terms shall the have meanings specified herein:

The term "content," unless otherwise specified herein, means any form of information that may be transmitted via a network including, but not limited to, the Internet and world wide web (WWW). For example, a news feed from a news service (e.g., ABCNEWS.COM) or any other multimedia stream of information (e.g., digital streams containing multimedia information such as sound files, 3D and other images, etc.) may be considered content. Typically, although not necessarily, content will be formatted into text files that may be published via the Internet and WWW.

The term "channel," unless otherwise specified herein, means a source of content to which network users may subscribe. For example, a channel would include the CHANNEL N™ channel operated by NETSCAPE COMMUNICATIONS CORP. In addition to the delivery of content, many channels also allow personalization and/or customization by a subscriber. For example, a subscriber may subscribe to a "financial news" channel and within that channel elect to specify and receive content related to "bonds."

The term "channel service/content provider," unless otherwise specified herein, means any person or entity that directly or indirectly (e.g., via a service provider) operates an Internet and WWW network channel service wherein content is prepared for broadcast over the Internet and WWW and which is intended to be received by one or more webtop client software packages which are operated by subscribers.

The term "subscriber," unless otherwise specified herein, means any person or entity (i.e., any network user) that registers with or otherwise requests delivery of content from one or more channel service/content providers. A subscriber may subscribe to one or more channels and receive corresponding content (e.g., a subscriber may subscribe to a "financial news" and a "sports" channel and receive corresponding content from both).

The term "webtop," unless otherwise specified herein, refers to a channel that may be anchored to a computer's desktop via an appropriate client software package that couples a channel service/content provider to a subscriber's automatic data processing system to manifest content received via the channel. For example, a webtop client software package would include the NETCASTER™ software package manufactured and marketed by NETSCAPE COMMUNICATIONS CORP.

The terms "push" or "pushed," unless otherwise specified herein, refer to the act on the part of a channel service/content provider to broadcast or deliver content to a subscriber's webtop client in accordance with a corresponding request for such content from the webtop client.

II. SYSTEM OVERVIEW

Referring now to FIG. 1, depicted therein is a diagram of a system wherein network channel content is automatically generated and broadcast to a channel subscriber according to a preferred embodiment of the present invention. In particular, system 100 includes a channel service/content provider 102, a channel subscriber 104, the Internet 106 including the WWW, and a set of exemplary content sources such as news feed 108, sports feed 110, and other content feed 112 (e.g., The Associated Press news wire, etc.). The arrangement and exemplary interconnections of the parts and people/entities forming system 100 will be readily apparent to those skilled in the art.

Figure 2:
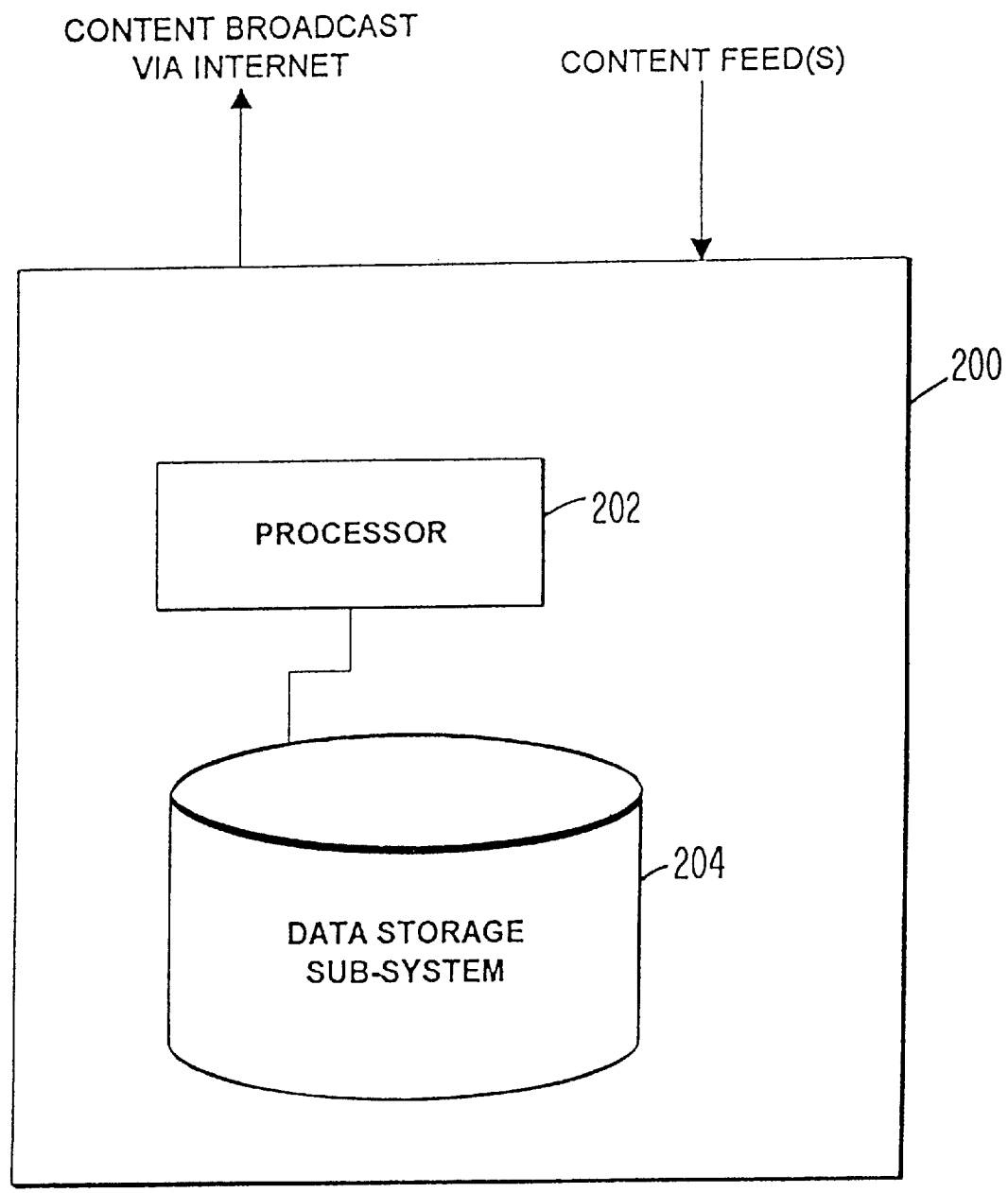
FIG. 2 is a block diagram of an automatic data processing system that is operated by the channel service/content provider depicted in FIG. 1.

Channel service/content provider 102 may be any entity that directly or indirectly (e.g., via a service provider) operates one or more Internet and WWW channel services wherein content which is prepared for broadcast over the Internet and WWW which is intended to be received by one or more webtop client software packages which are operated by subscribers such as channel subscriber 104. For example, NETSCAPE COMMUNICATIONS CORPORATION operates a WWW-based channel known as the CHANNEL N™ channel which features and broadcasts content related to NETSCAPE® products and related news. In FIG. 1, channel service/content provider 102 may utilize the content feeds from news feed 108, sports feed 110, and other content feed 112 to produce its content that it ultimately will distribute in the context of one or more corresponding channels. Additionally, channel service/content provider 102 may generate its own content from its own sources (e.g., personnel, automatic content sources, etc.) for distribution. In any case, channel service/content provider 102 operates an automatic data processing system to generate and broadcast content via a network channel. An automatic data processing system that may be used by channel service/content provider 102 is shown in FIG. 2.

Figure 4:
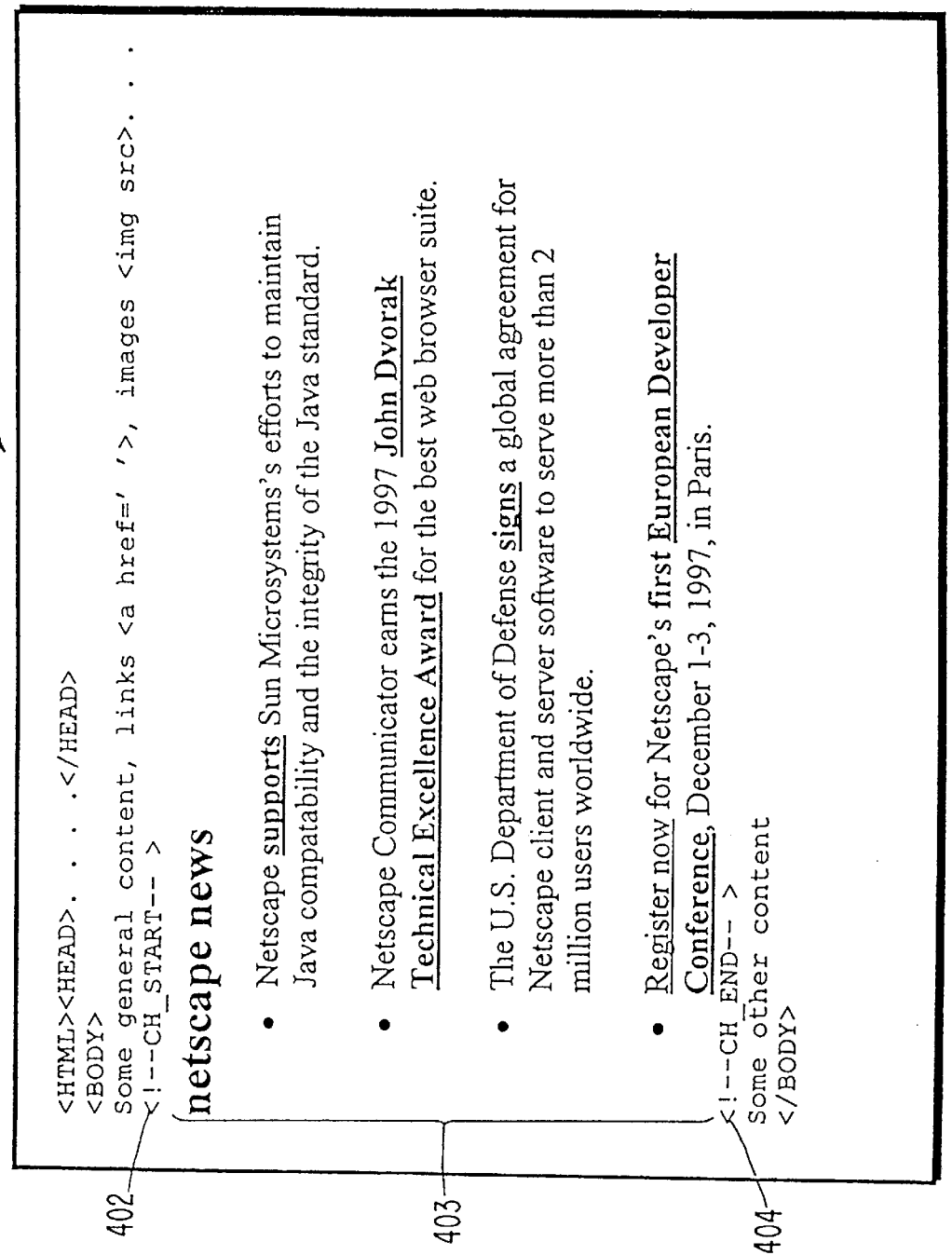
FIG. 4 is a sample network document containing channel start and end tags that specify a section of content to be displayed via a network channel according to a preferred embodiment of the present invention.

Channel service/content provider 102 is able to automatically generate content that may be broadcast via a channel over the Internet and WWW by taking advantage of channel tags that may be inserted into network documents either by channel service/content provider 102 or by information feed services that channel service/content provider 102 employs for content generation. Such channel tags are used to specify sections of network documents that can be extracted by appropriate software tools according to the present invention and then later stored and placed into a network accessible resource (e.g., a directory within a disc sub-system of a file storage system of an appropriate network server arrangement, etc. A sample network document that has been marked with channel tags is shown in FIG. 4. A flowchart in FIG. 7 illustrates the operations carried out within system 100 to bring about such automatic content specification and generation.

Channel subscriber 104 operates an automatic data processing system (shown in FIG. 3) that may be coupled to the Internet and WWW via a direct network connection, a dial-up connection through an ISP, or via some other connection which will be readily apparent to those skilled in the art. The automatic data processing system that channel subscriber 104 uses to receive content from channel service/content provider 102 may be a personal computer (e.g., an IBM® compatible personal computer running the Windows95™ operating system, a computer workstation manufactured by SUN MICROSYSTEMS, INC., a MACINTOSH computer system, etc.). In the case that channel subscriber 104 seeks to receive content from the CHANNEL N™ network channel, channel subscriber 104 will access the same via the Internet and WWW by using a webtop client software package such as the NETCASTER™ component of the NETSCAPE® COMMUNICATOR™ browser suite of products which is manufactured and marketed by NETSCAPE COMMUNICATIONS CORPORATION. Such software will allow channel subscriber 104 to receive content from the CHANNEL N™ channel automatically and without manually directing a web browser to a particular web site.

Figure 5:
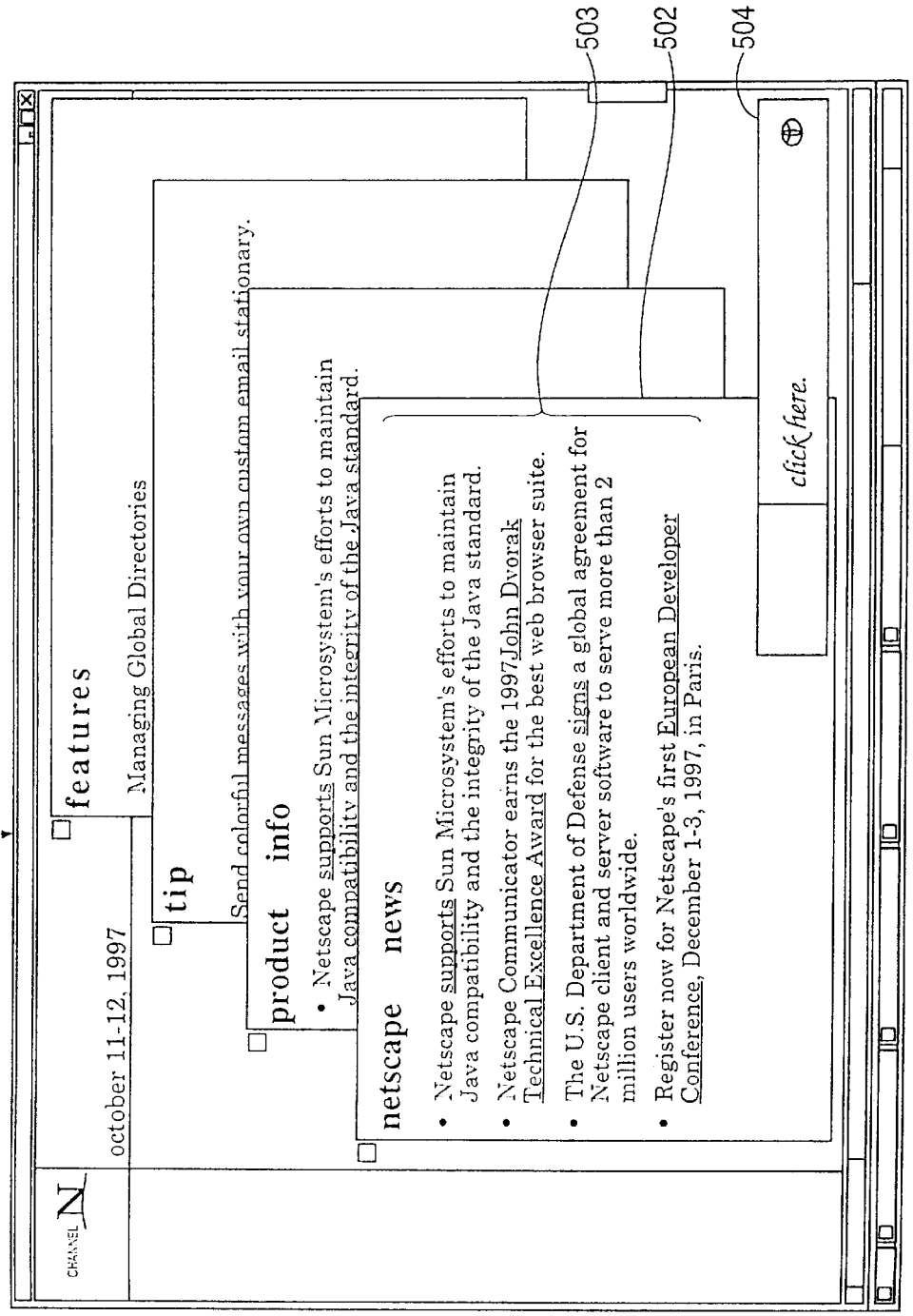
FIG. 5 is a screen display image from a network channel corresponding to the specified section of content from the network document depicted in FIG. 4.
Figure 6:
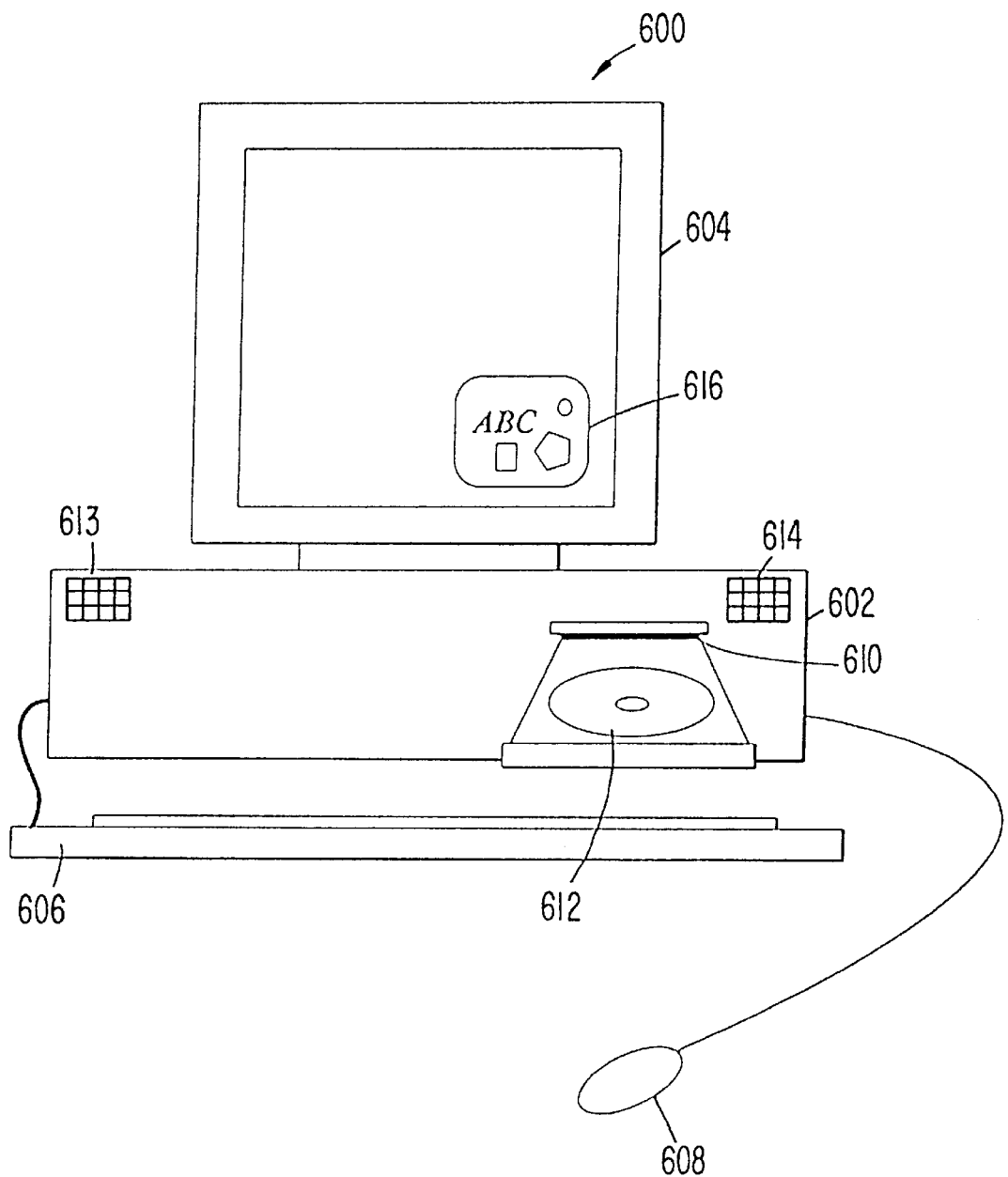
FIG. 6 is a diagram of a personal computer that has received content via a network channel according to the present invention.

The content received by channel subscriber 104 will look like or similar to a screen image illustrated in FIG. 5. That screen image was content viewed via the NETCASTER™ software package. As discussed below, FIG. 6 illustrates a personal computer that has used a compact disc to load appropriate webtop client software which may be used to receive and manifest content that was automatically generated in accordance with the present invention. Finally, as discussed in regard to FIG. 8, a flowchart therein depicts the operations carried out by a channel subscriber's automatic data processing system to receive and manifest content received from a network channel.

It should be noted that although FIG. 1 illustrates a network topology including the Internet and WWW, the present invention is not so restricted or limited. To the contrary, the present invention may be implemented in an intranet or extra-net setting wherein a network is enclosed within an organization and/or is accessible to only a specified group of network users. Accordingly, there is no requirement that a channel be limited to use via the Internet and WWW. Instead, a channel may be implemented in an intra-organizational setting wherein new and current content about organizational issues and happenings is continuously updated and automatically generated for push delivery to appropriate and designated network users.

III. STRUCTURAL DETAILS

As described above, FIG. 1 illustrates a system wherein content may be automatically generated and broadcast or pushed to subscribers according to a preferred embodiment of the present invention. The following paragraphs are directed to the specific structures and their corresponding operations that form the parts of system 100 and are illustrated in FIGS. 2–8.

Referring now to FIG. 2, depicted therein is an automatic data processing system that is used by channel service/content provider 102. In particular, automatic data processing system 200 includes a processor 202 and a data storage sub-system 204. Automatic data processing system 200 is a WWW enabled server system that is configured with input and output structures to allow content feed(s) to be input and stored in data storage sub-system 204, and to allow corresponding, automatically generated channel content to be broadcast or pushed to subscribers via the Internet and WWW.

Automatic data processing system 200 may be any form of computer automatic data processing system including single or multiple processor computer systems and networked architectures such as those manufactured by SUN MICROSYSTEMS, INC. or any other system of similar or like functionality. Preferably, however, automatic data processing system is a SUN SPARC 20 or a WINDOWS® NT™ system which may be configured to run NETSCAPE® ENTERPRISE SERVER™ to enable WWW server functionality and the like Additionally, other web (http) servers such as NETSCAPE® FASTRACK™, APPACHE™ or MICROSOFT IIS™ could drive channels and channel services. In any case, it should be understood that a single web (http) server could deliver multiple channels simultaneously.

Figure 3:
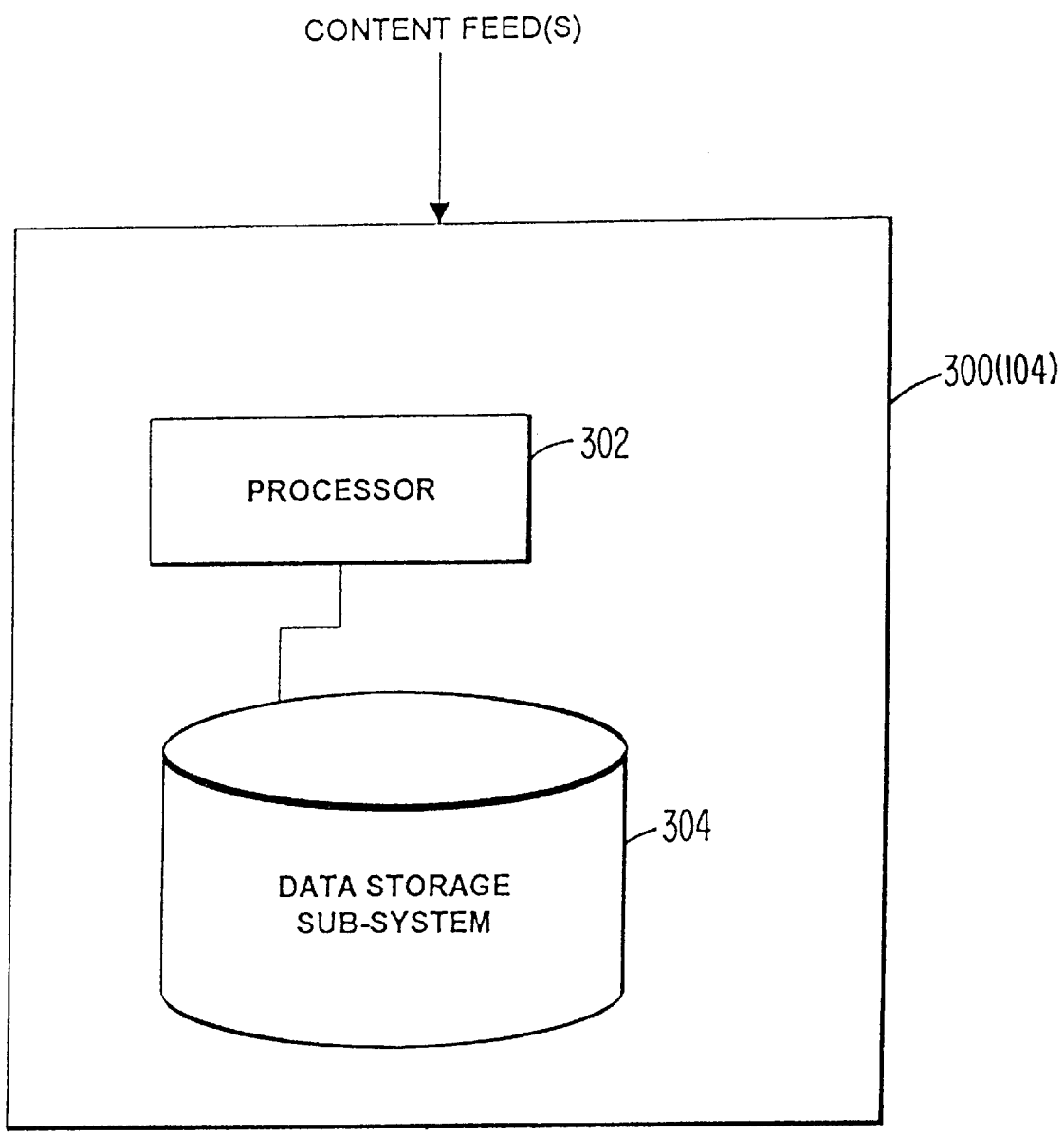
FIG. 3 is a block diagram of an automatic data processing system that is operated by the channel subscriber depicted in FIG. 1.

Referring now to FIG. 3, depicted therein is a block diagram of an automatic data processing system that is operated by channel subscriber 104. In particular, automatic data processing system 300 includes a processor 302 and a data storage sub-system 304. Automatic data processing system 300 is a WWW enabled client computer system that is configured, among other things, with input/output structures (e.g., a modem, a network interface card, etc.) to allow content feed(s) from one or more channel service/content providers such as a channel service/content provider 102 to be input and stored in data storage sub-system 304, and to be manifested by other structures and peripherals coupled to automatic data processing system 300 (e.g., a display monitor, speakers, etc.—not shown). As discussed below, FIG. 6 illustrates a personal computer-type automatic data processing system having peripherals which may be used to manifest content received via channel.

Automatic data processing system 300 may be any form of computer automatic data processing system including single or multiple processor computer systems. For example, automatic data processing system 300 may be an IBM® compatible computing system having a PENTIUM II™ microprocessor and which is configured to run the WINDOWS® NT™ operating system which is manufactured and marketed by MICROSOFT CORPORATION. Preferably, automatic data processing system 300 is configured to operate under the control of an application program such as the NETSCAPE® COMMUNICATOR™ web browser suite to communicate with channel service/content provider 102 via the Internet and WWW. Such communications will be readily understood by those skilled in the art.

Automatic data processing system 200 and automatic data processing system 300 are configured to operate together in a client-server/channel service provider-subscriber relationship. In that relationship, channel service/content provider 102 and automatic data processing system 200 will generate and/or receive content from other feeds (e.g., news sources) that has special channel tags embedded therein to specify content that is to be pushed in the context of a channel content stream to subscriber 104 who operates automatic data processing system 300. A sample network document (e.g., an HTML document) that contains content to be broadcast via a channel by channel service/content provider 102 is shown in FIG. 4. A screen display of a channel containing content corresponding to the content specified in FIG. 4 is shown in FIG. 5.

Referring now to FIG. 4, depicted therein is a network document such as a hypertext markup language (HTML) document that may be placed into a client-server setting so that it may be served/distributed by a web server (e.g., automatic data processing system 200 configured with appropriate web server software) to a web client (e.g., automatic data processing system 300 configured with appropriate webtop software) via the Internet and WWW. In particular, network document 400 is a text file containing human readable markup language instructions and content which may be processed by a web browser to render a screen image. Two channel tags 402 and 404 have been included within network document 400 to specify a section of network document 400 that is to be treated as content possibly for both a static, conventional web site and for a dynamic channel that is to be offered by channel service/content provider 102 is (FIG. 1).

In network document 400, channel tags 402 and 404 are start and end tags which specify corresponding start and end positions. In particular, start channel tag 402 has the appearance of <!—CH_START—> while end channel tag 404 has the appearance of <!—CH_END—>. These channel tags are implemented as HTML tags and will not affect the rendering of the rest of network document 400 within a web browser.

It should be understood that although channel tags 402 and 404 have particular looks within network document 400, the present invention is not so limited. In fact, any format and appearance of start and end tags may be used to suit particular design requirements. Moreover, it is quite possible that the start and end tags could be configured to carry additional information such as channel specification to specify to which channel the corresponding content is to be directed, temporal specifications to specify time periods when corresponding content is to be displayed, viewer discretion information, or any other information that may be suited to channel play/display of content.

In particular, a channel tag according to the present invention could be formatted to include content-type information that specifies the nature of the tagged content, billing information that specifies the nature of any charges that may be associated with receiving and manifesting such content, and priority information that specifies a priority rating to such content such "late breaking news," "public service announcement," "low priority," "high priority," "urgent," etc. to trigger appropriate and responsive type rendering within a webtop client. For example, a channel tag according to the present invention that carries such additional information may look like: <!—CH_START "FINANCIAL INFORMATION" "$0.55" "HIGH PRIORITY"—>. The previous channel tag would indicate the start of channel content within a network document that related to financial information (e.g., business news), having a webtop display cost of 55 cents, and which is of HIGH PRIORITY (e.g., a corporate merger that subscribers would find very interesting and that may have a significant stock market impact).

In the case that channel tags are implemented to contain additional information beyond content start and stop indicators, other information processing systems such as billing systems, database systems, etc. may need to be implemented to manage corresponding processing and the like. Such "down-stream" processing systems (e.g., billing systems, etc.) will be readily understood by those skilled in the art.

It should be understood that there is no requirement that channel tags according to the present invention be paired. In fact, the present invention contemplates the case where a channel tag may be placed into a network document to specify a section of the network document that begins at the position of the inserted channel tag and that extends to the end of the network document or to some other point in the network document (e.g., the next n lines, etc.). Additionally, channel tags may be nested according to priority level to specify rendering levels within webtop client. Accordingly, one or more channel tags may be used to specify content and, possibly, how it is to be treated and/or rendered by a webtop client.

Channel tags 402 and 404 may be inserted into network document 400 manually by operators as they produce web site content. For example, a person responsible for web site content may choose to specify that a headline or news section of a network document to be displayed during conventional web site access also is to be distributed via a channel. In that case, the web site content creator could simply insert a start tag like channel tag 402 into network document 400 before news section 403 and then insert an end tag like channel tag 404 into network document 400 after news section 403. As such, when an appropriate utility scans network document 400 for channel content, news section 403 will be extracted and placed in a channel broadcast. That utility is discussed below in regard to FIG. 7.

Additionally, channel tags 402 and 404 may be inserted into network document 400 automatically such as by an entity that feeds content to channel service/content provider 102. For example, the present invention contemplates the case where content providers produce feeds such as news feeds that contain channel tags identifying particular news events related to politics and the world economy, sports news related to particular teams, etc. In any case, a channel service/content provider that receives such feeds can now automatically scan such feeds to look for specific content that relates to the particular interests of its channel subscribers.

In either case of channel tagging (manual or automatic), channel service/content providers can now automatically generate content by having automatic processes in place to scan and extract specified content for later storage and broadcast via a network channel over the Internet and WWW.

In addition to the comments regarding channel tags presented above, it should be noted that it is possible that a network document (or part thereof) may be tagged multiple times for corresponding purposes. For example, a network document containing new content may be tagged for both "Financial" and another topic like "FRENCH DEVELOPMENT" Accordingly, channel tags according to the present invention will allow content providers and channel service providers great flexibility in terms of distributing content that may be marked for particular audiences and channels.

Furthermore, it should be noted that although content like network document 400 will likely be created manually such as by a person who actually places channel tags in a text document, the present invention is not so restricted. To the contrary, network document 400 also could be created automatically. For example, a thermostat or other control device within an automated control system may be configured to generate messages such as text messages that contain temperature readings and the like and which are to be placed into a database management system. A database program could then be configured to access the database management system to generate markup language (e.g., HTML) files or content which may be provided by a channel. Additionally, the database program could automatically generate tags as opposed to having a live operator place the same therein. Accordingly, the present invention should be understood as contemplating any type of network document that is to contain channel tags and that may be created manually or automatically.

Accordingly, after network document 400 has been channel tagged, it may be processed (as described in regard to FIG. 7) to ultimately drive a network channel such as the CHANNEL N™ network channel operated by NETSCAPE COMMUNICATIONS CORP. Accordingly, FIG. 5 illustrates a screen display image of a network channel corresponding to news section 403 from network document 400 (FIG. 4). In particular, screen image 500 shows a screen during operation of the NETCASTER™ webtop client software package which has accessed the CHANNEL N™ network channel. A stream of content 502 is displayed within screen image 500 and contains a text section 503 corresponding to news section 403 of network document 400. Text section 503 contains only that portion of network document 400 that was specified by channel tags 402 and 404. The layout of content within a webtop client such as within the NETCASTER™ webtop client to form screen displays similar to screen image 500 can be controlled through Java Script accessible style sheets. If graphics form part of the content, additional rendering layers may be used.

Also shown in screen image 500 is an advertising banner 504 which, in this case, is an advertising banner sponsored by TOYOTA, the automobile manufacturer. Since a network channel such as CHANNEL N™ will be more dynamic and content-rich as a result of the present invention, advertisers will likely be more willing to advertise as a result of increased demand and traffic that may result related to the network channel.

Referring now to FIG. 6, depicted therein is a diagram of a personal computer that has received content via a network channel according to the present invention. In particular, personal computer 600 includes a central processor unit 602 (which contains a processor and a data storage sub-system—not shown), a display monitor 604 for manifesting computer generated images containing text and graphics, a keyboard 606, and a mouse pointing device 608. Personal computer 600 includes a compact disk drive 610 which is used to retrieve content such as reference and computer program information stored on compact disks. One such compact disk may contain a software program that contains a webtop client software package that may be used to retrieve and receive content via a network channel and that was automatically generated in accordance with the present invention. A sound system including speakers 613 and 614 are provided to manifest sound-based content that may be generated within personal computer 600 and which may be received from other content sources such as a network channel.

In FIG. 6, display monitor 604 has been caused to display a window 616 containing text and graphics. Window 616 corresponds to a webtop client that manifests content which has been anchored to a screen-desktop area or window section of personal computer 600. Window 616 has displayed content that was automatically generated and push-delivered to personal computer 600 by a channel service/content provider via the Internet and WWW according to the present invention.

IV. OPERATIONAL DETAILS

The functionality of the automatic data processing systems operated by channel service/content provider 102 and channel subscriber 104 depicted in FIGS. 2 and 3, respectively, is now described with reference to FIGS. 7 and 8, respectively. In particular, FIGS. 7 and 8 illustrate the processes carried out within system 100 to automatically generate content that may be broadcast by channel service/ content provider 102 to channel subscriber 104 via the Internet and WWW. Unless otherwise provided or indicated, the programming constructs and methodologies employed to implement computer software to carry out the functions and operations identified in FIGS. 7 and 8 will be readily understood by those skilled in the art. In particular, the computer software modules necessary to enable client-server network communications and manifestation of digital streams representative of multimedia content objects will be immediately understood by those skilled in the art of computer programming and modern computer networking.

Referring now to FIG. 7, depicted therein is a flow chart that illustrates the operations carried out by automatic data processing system 200 (FIG. 2) to automatically generate content for a network channel according to a preferred embodiment of the present invention. In particular, processing starts at Step S7-1 and immediately proceeds to Step S7-2 where channel service/content provider 102 will create and/or receive content from one or more feeds to produce one or more network documents. If such network document(s) are generated by feeds to channel service/content provider 102, they may already contain channel tags as illustrated in and discussed above in regard to FIG. 4.

Next, at Step S7-3, channel service/content provider 102 will ensure that the network document(s) produced or received in Step S7-2, are properly marked with appropriate channel tags to specify channel content.

Next, at Steps S7-4 and S7-5, automatic data processing system 200, under computer software control, will scan the tagged network documents for specified channel content. This step may be carried out using a UNIX shell script which is named herein as "getcontent" for purposes of discussion. The following version of the getcontent script was implemented on a SILICON GRAPHICS (SGI) computer system and on an HEWLETT PACKARD computer system which run UNIX Version IRIX V6.3 and HP/UX V10.2, respectively. The implemented version of getcontent is as follows:

```
#!/bin/sh
if [ $# !='6']
then
    echo 'usage: getcontent host port fname localfile begintag endtag' exit 1;
fi
getcommand='GET '$3' http/1/1\n\n'
echo $getcommand | tenet $1 $2 | awk '/'$5'/,/'$6'/' >$4
```

The getcontent script may be invoked with a command string as follows:

getcontent people.netscape.com 80/content_dir/ index.html layer.html '<!—CH_START—>''<!—CH_END——>'

As noted above, automatic data processing system 200 scans network document(s) for appropriate content in accordance with computer software controls. Such computer software controls could be configured to cause network document scanning according to a schedule and at predefined intervals. For example, a channel service/content provider may be able to receive news feed data at certain times during a period of time such as "every hour on the hour of every day." As such, automatic data processing system 200 could be configured to scan network documents ten minutes after the start of each hour (e.g., 1:10 p.m.) of each day. The programming necessary to bring about scheduled network document scanning will be readily understood by those skilled in the art.

After getcontent was invoked as indicated above against the channel tagged network document shown in FIG. 4, the content displayed within the screen image shown in FIG. 5 was automatically generated.

Accordingly, after one or more network documents has been scanned in Step S7-4 and specified content has been automatically extracted in Step S7-5, processing proceeds to Step S7-6 where the extracted content will be stored in data storage sub-system 204 and, in particular, in a network addressable resource or location therein. For example, the extracted content could be stored in a file in a network addressable directory that may be accessed by channel subscribers to retrieve new and dynamic content via the Internet and WWW.

Processing ends at Step S7-7.

In addition to the steps carried out in the flow-chart illustrated in FIG. 7, other steps and functions may be added to suit particular design requirements. For example the getcontent routine could be modified to include parameters and constructs that control when automatic content extraction and generation occurs. Moreover, other parameters and constructs may be added to control how content is generated based on subscriber types, target channels, etc. In the flowchart of FIG. 7, such other functionality could be included as steps carried out before, during, or after Steps S7-4 and S7-5. In any case, the steps illustrated within FIG. 7 will allow channel service/content provider to efficiently and automatically generate dynamic channel content from various sources including already existing static network documents that were originally intended to be published via a conventional web site.

Referring now to FIG. 8, depicted therein is a flow chart that illustrates the operations carried out by automatic data processing system 300 to receive and manifest content that is automatically generated by channel service provider 102 according a preferred embodiment of the present invention. In particular, processing starts at Step S8-1 and immediately proceeds to Step S8-2 where channel subscriber 104 starts his webtop client or the same is started automatically based on previously established start-up and set-up parameters. By starting the webtop client, a window similar or like window 616 (FIG. 6) will be displayed to manifest content received from a channel service/content provider.

Next, at Step S8-3, the channel subscriber's webtop client will access channel service/content provider 102's network addressable resource for retrieval of automatically generated content.

Next, at Step S8-4, the channel subscriber's webtop will receive current content from channel service/content provider via push delivery possibly as a background task, that is automatically spawned within automatic data processing system 300.

Thereafter, at Step S8-5, any content received from channel service/content provider 102 will be manifested by peripherals coupled to automatic data processing system 300. That is, depending on the nature of the content received via the particular network channel to which channel subscriber 104 subscribes, he may receive multimedia content for display on a monitor like display monitor 604 (FIG. 6), for sound reproduction on speakers 613 and 614 (FIG. 6), etc.

Processing ends at Step S8-5.

Thus, having fully described the present invention by way of example with reference to the attached drawing figures, it will be readily appreciated that many changes and modifications may be made to the invention and to the embodiments shown and/or described herein without departing from the spirit or scope of the present invention which is defined in and covered by the appended claims.

What is claimed is:

1. A method for generating content for a network channel, comprising the steps of:
   specifying a section of a network document to be broadcast via said network channel;
   automatically scanning said network document to extract and store said section of said network document in a network addressable resource; and
   accessing said network channel and said network addressable resource to retrieve said section of said network document, said section of said network document retrieved from said network addressable document to be manifested by a network client.

2. The method according to claim 1, wherein said section of said network document is specified by a start tag and an end tag.

3. The method according to claim 1, wherein said section of said network document is specified by at least one tag.

4. The method according to claim 3, wherein said network document is an HTML document and said at least one tag is an HTML tag.

5. The method according to claim 3, wherein said at least one tag contains additional information including content-type information.

6. The method according to claim 1, wherein said network addressable resource is addressable by a webtop client.

7. The method according to claim 1, further comprising a step of establishing when said specifying, scanning, and accessing steps are to occur.

8. The method according to claim 1, wherein said scanning step is performed based on a pre-defined schedule.

9. A method for generating content for a network channel, comprising the steps of:
   automatically scanning a network document for a specified section thereof to be broadcast via said network channel; and
   automatically storing said section of said network document in a network addressable resource, said network channel and said network addressable resource configured to be accessed by a network client to retrieve said specified section of said network document.

10. The method according to claim 9, further comprising a step of establishing when said scanning and said storing steps are to occur.

11. The method according to claim 9, wherein said specified section of said network document is specified by a plurality of tags.

12. The method according to claim 9, wherein said specified section of said network document is specified by at least one tag.

13. The method according to claim 12, wherein said network document is an HTML document and said at least one tag is an HTML tag.

14. The method according to claim 12, wherein said at least one tag includes additional information including content-type information.

15. The method according to claim 9, wherein said network client is a webtop client.

16. A method for manifesting content received via a network channel, comprising the steps of:
   accessing a network channel and a corresponding network addressable resource, said network addressable resource storing automatically generated content corresponding to a specified section of a network document,
   retrieving said automatically generated content corresponding to said specified section of said network document via said network channel; and
   manifesting said automatically generated content corresponding to said specified section of said network document.

17. The method according to claim 16, wherein said network document is an HTML document.

18. The method according to claim 16, wherein said accessing and retrieving steps are carried out by a webtop client.

19. The method according to claim 16, wherein said manifesting step is carried out by one or more peripherals of an automatic data processing system.

20. The method according to claim 16, wherein said manifesting step includes a step of causing a display device to display said automatically generated content thereon.

21. A computer-readable medium containing a software program operative to control an automatic data processing system, comprising:
   an access module for accessing a network channel and a corresponding network addressable resource, said network addressable resource storing automatically generated content corresponding to a specified section of a network document,
   a retrieval module for retrieving said automatically generated content corresponding to said specified section of said network document via said network channel; and
   a manifestation module for causing said automatic data processing system to manifest said automatically generated content corresponding to said specified section of said network document.

22. The computer-readable medium according to claim 21, wherein said network document is an HTML document.

23. The computer-readable medium according to claim 21, wherein said manifestation module includes instructions for causing a display device of said automatic data processing system to display said automatically generated content thereon.

24. A system for automatically generating content for distribution via a network channel, comprising:
   a channel service provider having a first automatic data processing system including a data storage sub-system for storing a network document and a first processor configured to specify a section of said network document to be broadcast via said network channel and to automatically scan said network document to extract and store said section of said network document in a network addressable resource within said data storage sub-system; and
   a second automatic data processing system coupled to said channel service provider and including a content manifestation device and a second processor configured to access said network addressable resource to retrieve said section of said network document and to cause said manifestation device to manifest said section of said network document.

25. The system according to claim 24, wherein said section of said network document is specified by a start tag and an end tag.

26. The system according to claim 25, wherein said start and end tags are implemented as control sequences contained within said network document.

27. The system according to claim 26, wherein said control sequences are comment strings.

28. The system according to claim 24, wherein said section of said network document is specified by at least one tag.

29. The system according to claim 28, wherein network document is an HTML document and said at least one tag is an HTML tag.

30. The system according to claim 28, wherein said at least one tag includes additional information such as content-type information.

31. The system according to claim 24, wherein said network document is an HTML document.

32. The system according to claim 24, wherein said second automatic data processing system is controlled by a webtop client.

33. A system for automatically generating content for a network channel, comprising
- a data storage sub-system storing a network document containing at least one tag specifying a section of said network document that is to be broadcast via said network channel; and
- a processor coupled to said data storage sub-system and operative to automatically scan said network document for said section thereof to be broadcast via said network channel, and to automatically extract and store said section of said network document in said data storage sub-system.

34. The system according to claim 33, wherein said network document is an HTML document.

35. The system according to claim 34, wherein said network client is a webtop client.

36. The system according to claim 33, wherein said data storage sub-system is accessible by a network client via the Internet, said network client configured to retrieve said section of said network document.

37. A system for manifesting content received via a network channel, comprising:
- a display device;
- a data storage sub-system; and
- a processor coupled to said data storage sub-system and to said display device, said processor operative to access said network channel and a corresponding network addressable resource, said network addressable resource storing automatically generated content corresponding to a specified section of a network document, said processor further operative to a retrieve said automatically generated content, to store said automatically generated content in said data storage sub-system, and to cause said display device to display said automatically generated content.

38. The system according to claim 37, wherein said network document is an HTML document.

39. The system according to claim 37, wherein said network addressable resource is a directory within a data storage system managed by a network server.

40. The system according to claim 37, wherein said specified section of said network document is specified by one or more tags.

41. The system according to claim 40, wherein said one or more tags include additional information such as content-type information, content-billing information, and content priority information.

* * * * *